United States Patent [19]
Back et al.

[11] Patent Number: 6,027,610
[45] Date of Patent: Feb. 22, 2000

[54] PRODUCTION OF SOFT PAPER PRODUCTS FROM OLD NEWSPAPER

[75] Inventors: Sangho Back, West Chester, Pa.; Nicholas W. Lazorisak, Hockessin, Del.; Norman L. Smeltzer, Folsom; John F. Schmitt, West Chester, both of Pa.

[73] Assignee: Kimberly-Clark Corporation, Neenah, Wis.

[21] Appl. No.: 08/478,484

[22] Filed: Jun. 7, 1995

Related U.S. Application Data

[62] Division of application No. 08/268,232, Jun. 29, 1994, Pat. No. 5,582,681.

[51] Int. Cl.$^7$ ............................................. B31F 1/12
[52] U.S. Cl. .................... 162/111; 162/147; 162/179; 162/100
[58] Field of Search ................. 162/5, 13, 72 B, 162/5 B, 147, 111, 100, 179, 11, 12, 141, 173, 112, 99

[56] References Cited

U.S. PATENT DOCUMENTS

| | | | |
|---|---|---|---|
| 2,110,032 | 3/1938 | Williams | 162/179 |
| 2,582,496 | 1/1952 | Massey et al. | 92/1.5 |
| 2,620,271 | 12/1952 | Ruff et al. | 92/1.5 |
| 2,743,178 | 4/1956 | Krodel et al. | 92/1.5 |
| 2,872,313 | 2/1959 | House et al. | 92/1.4 |
| 2,916,412 | 12/1959 | Altmann et al. | 162/4 |
| 2,959,513 | 11/1960 | Savage | 162/6 |
| 3,014,832 | 12/1961 | Donnelly | 162/111 |
| 3,047,452 | 7/1962 | De Vos | 162/5 |
| 3,056,713 | 10/1962 | Gartner | 162/5 |
| 3,098,784 | 7/1963 | Gorman, Jr. | 162/5 |
| 3,261,741 | 7/1966 | Bidwell | 162/261 |
| 3,354,028 | 11/1967 | Illingworth et al. | 162/5 |
| 3,392,083 | 7/1968 | Illingworth | 162/5 |
| 3,427,217 | 2/1969 | Miller | 162/6 |

(List continued on next page.)

FOREIGN PATENT DOCUMENTS

| | | |
|---|---|---|
| 1114112 | 12/1981 | Canada . |
| 1132309 | 9/1982 | Canada . |
| 1135460 | 11/1982 | Canada . |

(List continued on next page.)

OTHER PUBLICATIONS

Quaker Chemical Corporation Product Data, *QuaSoft* 206, Tissue and Towel Debonding Agent, Aug. 6, 1996, 1 page.
Quaker Chemical Corporation Product Data, *QuaSoft* 216, Tissue and Towel Debonding Agent, Aug. 22, 1996, 1 page.
Quaker Chemical Corporation Product Data, *QuaSoft* 230, Tissue Debonding Agent, Aug. 6, 1996, 1 page.
Quaker Chemical Corporation Product Data, *QuaSoft* 232, Tissue Debonding Agent, Aug. 5, 1996, 1 page.
Quaker Chemical Corporation Product Data, *QuaSoft* 215, Tissue Softening Agent Aug. 6, 1996, 1 page.
Quaker Chemical Corporation Product Data, *QuaSoft* 219, Tissue Softening Agent, Aug. 6, 1996, 1 page.

(List continued on next page.)

*Primary Examiner*—Stanley S. Silverman
*Assistant Examiner*—Jose A. Fortuna
*Attorney, Agent, or Firm*—Karl V. Sidor

[57] ABSTRACT

A sanitary paper product made from newspapers containing coarse cellulosic fibers and printed with ink that contains oil and a method for making the same is provided. The method has the step of (a) pulping the newspapers in water with agitation to produce a pulp slurry at a consistency between 3% and 12% and a pH below about 8.0; (b) adding to the slurry an enzyme selected from the group consisting of cellulase, hemicellulase, and lipase and maintaining the pulp slurry at a temperature above about 100° F. for at least 15 minutes; (c) maintaining at least about 2% of the oil in contact with the newspaper fibers beginning with the making of the pulp slurry in step (a) through step (b); and using the enzyme treated pulp as a major source of fiber in the paper making process to produce sanitary paper products.

7 Claims, 1 Drawing Sheet

U.S. PATENT DOCUMENTS

| | | | |
|---|---|---|---|
| 3,446,696 | 5/1969 | Illingworth | 162/5 |
| 3,620,909 | 11/1971 | Gleason | 162/8 |
| 3,635,789 | 1/1972 | Green, Jr. | 162/5 |
| 3,812,000 | 5/1974 | Salvucci, Jr. et al. | 162/111 |
| 3,821,068 | 6/1974 | Shaw | 162/111 |
| 3,833,460 | 9/1974 | Iannazi et al. | 162/5 |
| 3,873,410 | 3/1975 | Chupka | 162/4 |
| 3,884,750 | 5/1975 | Iannazzi | 162/4 |
| 3,897,301 | 7/1975 | Bauman et al. | 162/189 |
| 3,932,206 | 1/1976 | Illingworth et al. | 162/5 |
| 3,957,572 | 5/1976 | Eriksson | 162/4 |
| 3,962,033 | 6/1976 | Eriksson et al. | 195/8 |
| 3,994,771 | 11/1976 | Morgan, Jr. et al. | 162/113 |
| 4,076,578 | 2/1978 | Puddington et al. | 162/5 |
| 4,102,737 | 7/1978 | Morton | 162/113 |
| 4,111,730 | 9/1978 | Balatinecz | 156/62.2 |
| 4,129,259 | 12/1978 | Vokes | 241/20 |
| 4,147,616 | 4/1979 | Balcar et al. | 209/12 |
| 4,157,952 | 6/1979 | Krofta | 209/170 |
| 4,158,594 | 6/1979 | Becker et al. | 162/112 |
| 4,222,819 | 9/1980 | Fossum et al. | 162/76 |
| 4,231,841 | 11/1980 | Calmanti et al. | 162/5 |
| 4,274,912 | 6/1981 | Carles et al. | 162/41 |
| 4,343,679 | 8/1982 | DeCeuster et al. | 162/4 |
| 4,347,099 | 8/1982 | DeCeuster et al. | 162/5 |
| 4,381,969 | 5/1983 | DeCeuster et al. | 162/5 |
| 4,390,395 | 6/1983 | DeCeuster et al. | 162/5 |
| 4,440,597 | 4/1984 | Wells et al. | 162/111 |
| 4,441,962 | 4/1984 | Osborn, III | 162/113 |
| 4,483,741 | 11/1984 | Maloney et al. | 162/5 |
| 4,487,655 | 12/1984 | Nöetzel et al. | 162/5 |
| 4,504,016 | 3/1985 | Wikdahl | 241/24 |
| 4,529,479 | 7/1985 | Tuomi | 162/29 |
| 4,562,969 | 1/1986 | Lindahl | 241/21 |
| 4,613,447 | 9/1986 | Hara et al. | 252/91 |
| 4,618,400 | 10/1986 | Wood et al. | 162/5 |
| 4,668,339 | 5/1987 | Terry | 162/4 |
| 4,704,201 | 11/1987 | Keck et al. | 209/17 |
| 4,710,267 | 12/1987 | Elsby et al. | 162/5 |
| 4,726,880 | 2/1988 | Smith | 162/4 |
| 4,776,926 | 10/1988 | Lindahl | 162/28 |
| 4,780,179 | 10/1988 | Clement | 162/5 |
| 4,845,148 | 7/1989 | Moore et al. | 524/512 |
| 4,865,690 | 9/1989 | Bernard et al. | 162/4 |
| 4,867,383 | 9/1989 | Terry et al. | 241/24 |
| 4,872,953 | 10/1989 | Smith | 162/261 |
| 4,880,498 | 11/1989 | Moore et al. | 162/164.6 |
| 4,904,524 | 2/1990 | Yoh | 428/311.3 |
| 4,909,900 | 3/1990 | Matzke et al. | 162/4 |
| 4,915,821 | 4/1990 | Lamort | 209/17 |
| 4,919,754 | 4/1990 | Mollett et al. | 162/5 |
| 4,923,565 | 5/1990 | Fuentes et al. | 162/72 |
| 4,950,545 | 8/1990 | Walter et al. | 428/446 |
| 4,969,976 | 11/1990 | Reed | 162/164 |
| 4,971,656 | 11/1990 | Lehmann et al. | 162/5 |
| 4,983,258 | 1/1991 | Maxham | 162/189 |
| 5,002,633 | 3/1991 | Maxham | 162/5 |
| 5,013,456 | 5/1991 | St. John et al. | 210/734 |
| 5,048,589 | 9/1991 | Cook et al. | 162/109 |
| 5,055,159 | 10/1991 | Blanchette et al. | 162/72 |
| 5,059,282 | 10/1991 | Ampulski et al. | 162/175 |
| 5,068,009 | 11/1991 | Jokinen et al. | 162/9 |
| 5,068,279 | 11/1991 | Morse | 524/593 |
| 5,069,751 | 12/1991 | Chamblee et al. | 162/5 |
| 5,073,234 | 12/1991 | Mollett et al. | 162/5 |
| 5,080,759 | 1/1992 | Buzby et al. | 162/158 |
| 5,084,135 | 1/1992 | Brooks et al. | 162/4 |
| 5,102,733 | 4/1992 | Zawadzki | 428/343 |
| 5,110,412 | 5/1992 | Fuentes et al. | 162/5 |
| 5,116,474 | 5/1992 | Fuentes et al. | 162/71 |
| 5,116,746 | 5/1992 | Bernier et al. | 435/172.3 |
| 5,118,389 | 6/1992 | Dubelsten et al. | 162/19 |
| 5,122,228 | 6/1992 | Bouchette et al. | 162/4 |
| 5,131,980 | 7/1992 | Chamblee et al. | 162/4 |
| 5,133,832 | 7/1992 | Gilkey | 162/4 |
| 5,137,599 | 8/1992 | Maxham | 162/5 |
| 5,158,697 | 10/1992 | Kawamori et al. | 252/60 |
| 5,169,497 | 12/1992 | Sarkar et al. | 162/158 |
| 5,179,021 | 1/1993 | du Manoir et al. | 435/278 |
| 5,207,924 | 5/1993 | Reed et al. | 210/734 |
| 5,211,809 | 5/1993 | Naddeo et al. | 192/6 |
| 5,225,046 | 7/1993 | Borchardt | 162/5 |
| 5,227,019 | 7/1993 | Borchardt | 162/6 |
| 5,227,020 | 7/1993 | Endres et al. | 162/8 |
| 5,227,023 | 7/1993 | Pounder et al. | 162/5 |
| 5,228,953 | 7/1993 | Bast et al. | 162/5 |
| 5,234,544 | 8/1993 | Naddeo | 162/5 |
| 5,238,538 | 8/1993 | Jagannadh et al. | 162/4 |
| 5,242,585 | 9/1993 | Krofta | 210/188 |
| 5,246,545 | 9/1993 | Ampulski et al. | 162/112 |
| 5,259,969 | 11/1993 | Srivatsa et al. | 252/60 |
| 5,269,942 | 12/1993 | Harrington, IV et al. | 210/727 |
| 5,271,805 | 12/1993 | Stockel et al. | 162/4 |
| 5,277,758 | 1/1994 | Brooks et al. | 162/4 |
| 5,286,347 | 2/1994 | Richardson | 162/199 |
| 5,286,392 | 2/1994 | Gray et al. | 210/727 |
| 5,302,245 | 4/1994 | Nadeau | 162/8 |
| 5,310,459 | 5/1994 | Krofta | 162/4 |
| 5,314,580 | 5/1994 | DiTullio | 162/5 |
| 5,316,621 | 5/1994 | Kitao et al. | 162/4 |
| 5,320,710 | 6/1994 | Reeves et al. | 162/111 |
| 5,324,390 | 6/1994 | Naddeo et al. | 162/6 |
| 5,332,471 | 7/1994 | Naddeo et al. | 162/6 |
| 5,348,620 | 9/1994 | Hermans et al. | 162/9 |
| 5,358,605 | 10/1994 | Dorflinger et al. | 162/4 |
| 5,360,512 | 11/1994 | Blum | 162/8 |
| 5,362,362 | 11/1994 | Cunningham et al. | 162/5 |
| 5,370,770 | 12/1994 | Johnson et al. | 162/6 |
| 5,380,444 | 1/1995 | Ryan et al. | 210/734 |
| 5,382,378 | 1/1995 | Guerrini et al. | 252/181 |
| 5,389,204 | 2/1995 | Ampulski | 162/135 |
| 5,391,261 | 2/1995 | VanDenBergh | 162/4 |
| 5,399,241 | 3/1995 | Oriaran et al. | 162/112 |
| 5,401,360 | 3/1995 | Galland | 162/8 |
| 5,405,495 | 4/1995 | Cosper et al. | 162/5 |
| 5,405,499 | 4/1995 | Vinson | 162/100 |
| 5,409,572 | 4/1995 | Kershaw et al. | 162/109 |
| 5,413,675 | 5/1995 | Ikonomou et al. | 162/5 |
| 5,415,734 | 5/1995 | Backlund et al. | 162/40 |
| 5,417,806 | 5/1995 | Matzke et al. | 162/4 |
| 5,425,899 | 6/1995 | Nguyen et al. | 252/321 |
| 5,429,716 | 7/1995 | Hache et al. | 162/7 |
| 5,433,824 | 7/1995 | Richardson | 162/8 |
| 5,441,601 | 8/1995 | Cosper et al. | 162/5 |
| 5,453,159 | 9/1995 | Markham | 162/4 |
| 5,464,501 | 11/1995 | Kogan et al. | 162/6 |
| 5,466,333 | 11/1995 | Guttag | 162/6 |
| 5,496,439 | 3/1996 | Carlson et al. | 162/4 |
| 5,496,445 | 3/1996 | Stockel et al. | 162/248 |
| 5,501,768 | 3/1996 | Hermans et al. | 162/9 |
| 5,501,774 | 3/1996 | Burke | 162/164.1 |
| 5,503,709 | 4/1996 | Burton | 162/6 |
| 5,505,817 | 4/1996 | Rodriguez et al. | 162/5 |
| 5,512,133 | 4/1996 | Markham | 162/4 |
| 5,514,249 | 5/1996 | Cauley et al. | 162/164.1 |
| 5,518,580 | 5/1996 | Ortner et al. | 162/4 |
| 5,520,780 | 5/1996 | Walker | 162/4 |
| 5,525,193 | 6/1996 | Franks et al. | 162/5 |
| 5,529,190 | 6/1996 | Carlton et al. | 209/170 |
| 5,529,660 | 6/1996 | Kogan et al. | 162/4 |
| 5,536,373 | 7/1996 | Carlson et al. | 162/261 |
| 5,538,596 | 7/1996 | Satterfield et al. | 162/164.5 |

| | | | |
|---|---|---|---|
| 5,549,787 | 8/1996 | Sain et al. | 162/5 |
| 5,560,805 | 10/1996 | Hamilton et al. | 162/5 |
| 5,562,803 | 10/1996 | Wang et al. | 162/5 |
| 5,567,272 | 10/1996 | Hentzschel et al. | 162/9 |
| 5,571,422 | 11/1996 | Magaraggia | 210/703 |
| 5,575,891 | 11/1996 | Trokhan et al. | 102/111 |
| 5,575,893 | 11/1996 | Khan et al. | 162/199 |
| 5,580,422 | 12/1996 | Hamilton et al. | 162/4 |
| 5,580,446 | 12/1996 | Markham | 210/202 |
| 5,582,681 | 12/1996 | Back et al. | 162/5 |
| 5,593,937 | 1/1997 | Saito et al. | 503/201 |
| 5,607,544 | 3/1997 | Salzburger et al. | 162/5 |
| 5,618,385 | 4/1997 | Jones et al. | 162/6 |
| 5,620,565 | 4/1997 | Lazorisak et al. | 162/72 |
| 5,622,597 | 4/1997 | Callen et al. | 162/5 |
| 5,624,569 | 4/1997 | Chung et al. | 210/727 |
| 5,626,718 | 5/1997 | Philippe et al. | 162/60 |
| 5,643,409 | 7/1997 | Hamaguchi et al. | 162/5 |
| 5,650,044 | 7/1997 | Serres | 162/4 |
| 5,651,879 | 7/1997 | Gonzalez | 209/170 |
| 5,656,130 | 8/1997 | Ali | 162/65 |

FOREIGN PATENT DOCUMENTS

| | | | |
|---|---|---|---|
| 1229955 | 12/1987 | Canada. | |
| 1266354 | 3/1990 | Canada. | |
| 1275757 | 11/1990 | Canada. | |
| 2064201 | 1/1991 | Canada. | |
| 2027385 | 4/1991 | Canada. | |
| 2056051 | 5/1992 | Canada. | |
| 2098092 | 6/1992 | Canada. | |
| 2104962 | 9/1992 | Canada. | |
| 2064280 | 10/1992 | Canada. | |
| 2076615 | 10/1993 | Canada. | |
| 2093260 | 10/1993 | Canada. | |
| 2133406 | 11/1993 | Canada. | |
| 2137236 | 12/1993 | Canada. | |
| 2156598 | 9/1994 | Canada. | |
| 2147276 | 3/1995 | Canada. | |
| 2152782 | 5/1995 | Canada. | |
| 2036313 | 12/1995 | Canada. | |
| 40873A1 | 12/1981 | European Pat. Off.. | |
| 0225940A1 | 6/1987 | European Pat. Off.. | |
| 0557651A1 | 9/1993 | European Pat. Off.. | |
| 0568404A1 | 11/1993 | European Pat. Off.. | |
| 57-170637 | 4/1984 | Japan | 162/5 |
| 1535001 | 12/1968 | United Kingdom. | |
| 2805445 | 9/1978 | United Kingdom. | |
| 2901942 | 8/1979 | United Kingdom. | |
| 2 231 595 | 11/1990 | United Kingdom | 162/5 |
| 2231595 | 11/1990 | United Kingdom. | |
| WO 91/14819 | 10/1991 | WIPO. | |
| WO 92/21816 | 12/1992 | WIPO. | |
| 93/07331 | 4/1993 | WIPO. | |
| 91/14819 | 10/1993 | WIPO | 162/5 |
| 95/10661 | 4/1995 | WIPO. | |
| 96/00811 | 1/1996 | WIPO. | |
| 96/04424 | 2/1996 | WIPO. | |
| 97/15711 | 5/1997 | WIPO. | |

OTHER PUBLICATIONS

Quaker Chemical Corporation Product Data, *QuaSoft* 223C, Towel and Tissue Softener, Aug. 6, 1996, 1 page.
Quaker Chemical Corporation Product Data, *QuaSoft* 228, Towel and Tissue Softener, Aug. 6, 1996 1 page.
Quaker Chemical Corporation Product Data, *QuaSoft* 275, Towel and Tissue Softener, Aug. 6, 1996, 1 page.
Quaker Chemical Corporation Product Data, *QuaSoft* 218, Tissue Softening Agent, Aug. 6, 1996, 1 page.
Quaker Chemical Corporation, QuaSoft Tissue and Towel Softener and Debonder Products, 2 pages.
Witco Corporation Ltd., "Softener, Debonder and Antistats for Tissues and Towels", 1994, 7 pgs.
Croda Chemicals Ltd., "Solan", Nov. 1991, 3 pgs.
Inpal S.A. Industrias Químicas, Informe Tecnico, Bersoft Cat Amaciante Para Celulose E Papel (w/attached English language translation: Inpal S.A. Industrias Químicas, Techical Report 4, "Bersoft Cat Paper and Cellulose Softener".
Ciba–Geigy, "®Sapamina OC, 6087 S, Suavizante para fibras naturales y sint,éticas", 4pgs (w/attached English language translation).
Proquimtex, Celusoft PQ–18, "Agente Suavizante Para Papeles Tissue", Rev. Apr. 7, 1997 (w/attached English language translation: Celusoft PQ–18, "Softener Agent For Tissue Paper").
Proquimtex, Celusoft PQ–20, "Agente Suacizante Para Papeles Tissue", Rev. Mar 7, 1997 (w/attached English language translation: Celusoft PQ–20, "Softener Agent For Tissue Paper") .
Proquimtex, Celusoft PIM–21 DEG, "Agente Suavizante Para Papeles Tissue", Rev. Apr. 7, 1997 (w/attached English language translation: Celusoft PIM–21 DEG, "Softener Agent For Tissue Paper").
Proquimtex, Celusoft PIM–28 DEG, "Agente Suavizante Para Papeles Tissue", Rev. Apr. 7, 1997 (w/attached English language translation: Celusoft PIM–28 DEG, "Softener Agent For Tissue Paper").
Osi Specialties, Inc. Osi Specialties Product Information, "NuWet™ Hydrophilic Finish Silicones for Nonwovens", 1994, 3 pgs.
Henkel Corporation, Henkel Paper Chemicals, Nopcowet® 201 Absorbency Aid Repulping Aid, 1994, 1 page.
Jackson et al., "Enzymatic modifications of secondary fibers," Tappi Journal vol. 76, No. 3, pp. 147–154, Mar. 1993.
Pommier et al., "Time for Enzymes?," Paper, vol. 214, No. 5, pp. 34–35, Dec. 1990.
Pommier et al., "Using enzymes to improve the process and the product quality in the recycled paper industry, Part I the basic laboratory work,"Tappi Journal, vol. 72, No. 6. pp. 187–191, Jun. 1989.
Pommier et al., "Using Enzymes to improve the process and the product quality in the recycled paper industry, Part 2: Industrial applications," Tappi Journall, vol. 73, No. 6, pp. 187–191, Dec. 1990.
United States Statutory Invention Registration; Reg. No. H1672; Published: Aug. 5, 1997; Filed Apr. 3, 1992; entitled *Tissue Products Made From Low–Coarseness Fibers;*Hermans et al.
Abstract; Japanese Patent 62 97993; Issued May 7, 1987; (Fujimoto Polcon KK).
Abstract, Japanese Patent 6–49792; Issued Feb. 22, 1994; (Mitsubishi Paper Mills Ltd.).
Patent Abstract of Europe, WO 09602700A1, Appl. No. FI 09500364W, Date Filed June 26, 1995, (Ahlstroem Oy).
Patent Abstract of Europe, DE 04116557A1, Appl. No. DE 04116557A, Date Filed May 21, 1991, (Escher Wyss GmbH).
Patent Abstract of Japan, 08–127989, Appl. No. 06–265786, Date Filed Oct 28, 1994, (Honshu Paper Co. Ltd.).
Patent Abstract of Japan, 05–156584, Appl. No. 03–318149, Date Filed Dec 2, 1991, (Honshu Paper Co. Ltd. et al.).
Kapadia, P.C.; "A Non–Chlorine Repulping Aide", Tappi Proceedings, 1992 Ppapermarks Conference, pp. 51–55.

Gilkey, M. et al. "Cold Dispersion Unit Boosts Deinking Efficiency at Japanese Tissue Mills", Pulp and Paper, Nov. 1988, pp. 100–103.

McBride, D., "Deinking Systems for Office Waste Offer 'Pay Now/Pay Later' Choices", Pulp and Paper, Apr. 1994, 6 pages.

Renders, A., "Hydrogen Peroxide and Related Chemical Additives in deinking Processes", Tappi Journal, Nov. 1993, vol. 76, No. 11, pp. 155–161.

Law, K.N. et al., "Effects of recycling on papermaking properties of mechanical and high yield pulps: Part 1: Hardwood pulps", Tappi Journal, Mar. 1996, vol. 79, No. 3, pp. 167–174.

Alanko, K. et al., "Recyclability of thermo–mechanical pulp fibres", Paperi Ja Puu–Paper and Timber, vol. 77, No. 5, 1995, pp. 315–328.

Hollmark, H., "Evaluation of tissue paper softness", Tappi Journal, Feb. 1983, pp. 97–99.

Bates, J.D., "Softness Index: fact or Mirage?", Tappi Journal, Apr. 1965, vol. 48, No. 4, pp. 63A–64A.

Bierman, C.J., "Paper Manufacture", Essentials of Pulping and Papermaking, Academic Press, Inc., pp. 209–213.

Heitmann, J. et al., "Enzyme Deinking of Newsprint Waste", from the Fifth Annual International Conference on Biotechnology in the Pulp & Paper Industry, Kyoto, Japan, May 27–30, 1992, published by Uni Publishers, Tokyo, 1992, pp. 175–180.

Fetterly, N., "The Role of Dispersion Within a Deinking System", *Progress in Paper Recycling* 1992, 11–20.

Gallagher, F., "The Big "D": Getting Rid of the Ink in Recycled Fiber", *Paper Age, Recycling Annual* 1992, pp. 23, 50.

Heitman et al., "Enzyme Deinking of Newsprint Waste", from the Fifth International Conference on Biotechnology in Kyoto, Japan (May 27–30, 1992).

Jossinet, J., "Custom De–Inking of Newsprint", *Pulp & Paper Canada* Mar., 1993, 94(3), T 69–T71.

Lorey, F., "Recycling from the Newsprint Perspective", *Paper Age Recycling Annual* 1991, pp. 9, 12, 13.

Ow, S., "Biological De–Inking Methods of Newsprint Wastepaper", *World Pulp & Paper Technolgy 1992*, Roberts, F. ed., Sterling Publications Intern. Ltd., 4 pages.

Prasad, D.Y. et al., "Enzymatic Deinking of Colored Offset Newpaper", Dept. of Wood and Paper Science, North Caroline State University.

Prasad, D.Y. et al., "Enzymatic Deinking of Black and White Letterspress Printed Newsprint Waste", Dept. of Wood and Paper Science, North Caroline State University.

Prasad, D.Y. et al., "Enzymatic Deinking of Flexographic Printed Newsprint: Black and Colored Inks", Dept. of Wood and Paper Science, North Caroline State University.

Shrinath, S. et al., "A Review of Ink Removal Techniques in Current Deinking Technology", TAPPI Proceedings from the 1990 Engineering Conference.

Product Sheet: Enzyme Process Division: Pulpzyme™HB (1 page) from NovoNordisk.

Product Sheet: Enzyme Process Division: Resinase™A 2X (1 page) from NovoNordisk.

Prasad, D.Y. et al., "Enzyme Deinking of Black and White Letterpress Printed Newsprint Waste", *Progress in Paper Recycling*1992, 1(3), 21–30.

Zeyer, C. et al., "Factors Influencing Enzyme Deinking of Recycled Fiber", *Tappi Journal*1994, 77(10), 169–177.

Heitmann, J. et al., "Enzyme Deinking of Newsprint Waste", from the Fifth Annual International Conference on Biotechnology in the Pulp & Paper Industry, Kyoto, Japan, May 27–30, 1992, published by Uni Publishers, Tokyo, 1992, pp. 175–180.

Fetterly, N., "The Role of Dispersion Within a Deinking System", *Progress in Paper Recycling* 1992, 11–20.

Gallagher, F., "The Big "D": Getting Rid of the Ink in Recycled Fiber", *Paper Age, Recycling Annual* 1992, pp. 23, 50.

Heitmann et al., "Enzyme Deinking of Newsprint Waste", from the Fifth International Conference on Biotechnology in Kyoto, Japan (May 27–30, 1992).

Jossinet, J., "Custom De–Inking of Newsprint", *Pulp & Paper Canada* Mar., 1993, 94(3), T69–T71.

Lorey, F., "Recycling from the Newsprint Perspective", *Paper Age Recycling Annual* 1991, pp. 9, 12, 13.

Ow, S., "Biological De–Inking Methods of Newsprint Wastepaper", *World Pulp & Paper Technology 1992*, Roberts, F. ed., Sterling Publications Intern. Ltd., 4 pages.

Prasad, D.Y. et al., "Enzymatic Deinking of Colored Offset Newspaper", Dept. of Wood and Paper Science, North Carolina State University.

Prasad, D.Y. et al., "Enzymatic Deinking of Black and White Letterpress Printed Newsprint Waste", Dept. of Wood and Paper Science, North Carolina State University.

Prasad, D.Y. et al., "Enzymatic Deinking of Flexographic Printed Newsprint: Black and Colored Inks", Dept. of Wood and Paper Science, North Carolina State University.

Shrinath, S. et al., "A Review of Ink Removal Techniques in Current Deinking Technology", TAPPI Proceedings from the 1990 Engineering Conference.

Product Sheet: Enzyme Process Division: Pulpzyme™HB (1 page) from NovoNordisk.

Product Sheet: Enzyme Process Division: Resinase™A 2X (1 page) from NovoNordisk.

Prasad, D.Y. et al., "Enzyme Deinking of Black and White Letterpress Printed Newsprint Waste", *Progress in Paper Recycling* 1992, 1(3), 21–30.

Zeyer, C. et al., "Factors Influencing Enzyme Deinking of Recycled Fiber", *Tappi Journal* 1994, 77(10), 169–177.

Jackson et al., "Enzymatic modifications of secondary fibers," Tappi Journal vol. 76, No. 3, pp. 147–154, Mar. 1993.

Pommier, "Time for Enzymes?," Paper, vol. 214, No. 5, pp. 34–35, Dec. 1990.

Pommier et al., "Using enzymes to improve the process and the product quality in the recycled paper industry. Part I the basic laboratory work," Tappi Journal, vol. 72, No. 6. pp. 187–191, Jun. 1989.

Pommier et al., "Using enzymes to improve the process and the product quality in the recycled paper industry,. Part 2: Industrial applications," Tappi Journall, vol. 73, No. 6, p. 187–191, Dec. 1990.

PRODUCTION OF SOFT PAPER PRODUCTS FROM OLD NEWSPAPER

This is a division of application Ser. No. 08/268,232, filed Jun. 29, 1994 now U.S. Pat. No. 5,582,681.

FIELD OF THE INVENTION

Paper products such as bathroom tissue, facial tissue, napkins and paper towels are made from recycled newsprint fibers still containing printing ink oils. These products exhibit premium level qualities in terms of softness, bulk, and flexibility. The novel process selectively treats newsprint fibers and contaminants in a way that makes the fibers feel softer and enhances papermachine operation with this type of furnish, thereby permitting higher product quality levels than previously possible with newsprint fibers.

BACKGROUND OF THE INVENTION

For each papermaking process a correlation exists between fiber coarseness and product quality in terms of product softness or handfeel. High quality and therefore expensive fibers such as bleached northern kraft softwood fibers are fine and flexible and produce high quality tissue products. In contrast, mechanical pulping of softwoods produces high yield, coarse fibers typically used in making newsprint. Newspapers contain a preponderance of coarse, high yield fibers, typically stone groundwood (SGW), thermomechanical (TMP), and/or chemithermomechanical (CTMP) fibers. Such coarse newsprint fibers are usually highly refined to cause fractures and fibrillations which aid in imparting strength to the resulting newsprint paper. Such refining changes the freeness of the coarse fibers from high freeness fibers to low freeness fibers. If such refined, coarse mechanical fibers are used in a tissue making process the resulting sheet has poor tissue properties because it is not soft. A recent thorough explanation of the understanding of the prior art about the relationship between tissue softness and fiber coarseness is contained in Canadian Patent No. 2,076,615.

Attempts to produce soft tissue or towel type sanitary paper products from a majority of high yield fibers such as CTMP, TMP or SGW pulp have not been successful. Likewise, producing soft tissue and towel products by recycling old newspapers has not been very successful partially because the predominant fiber in old newspapers are low freeness, coarse, high yield fibers. Another complicating factor in producing soft tissue and towel products by recycling old newspapers is the difficult papermachine operation caused by poor drainage associated with low freeness fibers and problems caused by high amounts of fines and other substances which separate from the fibers and accumulate in the papermachine water system (whitewater). These materials make it difficult to crepe the tissue sheet from the Yankee drying cylinder and therefore necessitate operating the papermachine at conditions which do not promote maximum softness. The present invention solves these difficulties by enzymatically modifying the fibers and by leaving a portion of the printing oils in the fibers, thereby softening the fibers and giving them release properties which aid in the creping step on the papermachine. Consequently, previously unachievable levels of tissue and towel softness are possible with the present invention and recycled newspaper fibers.

Conventional recycling of old newspapers to obtain fibers comparable to the type of fibers used to originally make the newsprint is known in the art as "deinking" and typically involves pulping, washing usually with surfactants, screening, solubilizing insoluble contaminants usually by strong caustic treatments, washing and bleaching of the fibers to counteract the yellowing effects of caustic treatments.

The first step in conventional recycling of old newspapers is to separate the paper into individual fibers in water to form a pulp slurry followed by removing inks and contaminants from the fibers by a combination of various process steps such as screening, centrifugal cleaning, washing, flotation and the like. The screening and centrifugal cleaning steps remove large contaminants such as paper clips, staples, plastics, etc. The primary purpose of washing and flotation steps is to solubilize and/or suspend contaminants in the water and to remove the contaminants from the fibers. Surfactants and caustic are added to facilitate the solubilization and separation of contaminants from the fibers. When caustic is used to facilitate contaminant removal, some yellowing of the fibers unfortunately occurs due to the caustic treatment. After or during caustic treatment and washing, the fibers are usually bleached (e.g.—with hydrogen peroxide) to counteract the yellowing effect of caustic or to produce better fibers having higher brightness than the fibers in the original waste paper. Cleaned, decontaminated, and bleached fibers are usually blended with virgin fibers and then used in a papermaking process for which the fibers properties are suitable. Because the starting fibers are newsprint type fibers, i.e., coarse, low freeness and low brightness, such recycled fibers are most often reused for making blank newsprint. They are generally not suitable because of their high coarseness and low freeness for making soft tissue products unless blended with a majority of higher quality fibers such as bleached northern softwood kraft pulp.

Conventional pulping of used newspaper to obtain recycled newsprint fiber is usually done in a high attrition pulper at a consistency of 4–8% and at 90° F.–160° F. for 20 minutes to 60 minutes depending on the exact type of waste paper being processed. Caustic soda or other alkaline substances such as sodium silicate are commonly used to raise the pH of the pulp slurry to 9–10 pH to aid in separating fibers (defibering) and also to loosen the inks and separate dirt from the fiber. At an alkaline pH vegetable oils in the inks are saponified by converting them into the corresponding soaps while mineral oils are emulsified by the combination of alkaline pH, soaps and surfactants, all of which enhance the removal of oils during washing. A surfactant deinking aid (for higher pH ranges) is usually added to further help separate inks from fiber.

The caustic step in recycling processes of old newsprint to obtain well cleaned quality fibers causes swelling of the fibers and usually solubilizes many components. In addition to saponifing vegetable based printing oils, caustic also saponifies natural organic acids typically present in old newspapers to produce the corresponding soaps of the saponifiable materials. Not only does this make the vegetable oils and organic acids water soluble as saponified soaps but, the soaps so formed, aid in removal of other contaminants from the fibers such as non-saponifiable printing oils (mineral oil). These substances are subsequently removed from the fibers by washing and/or flotation after the caustic treatment.

A major recycler of old newspapers, Garden State Paper, in recent journal articles, one entitled "The Big "D": Getting Rid of the Ink in Recycled Fiber appearing in the journal Paper Age, 1991 Recycling Annual, at pages 23 and 50 and the other article entitled "Recycling From the Newsprint Perspective, at pages 9, 12 and 13 of the same 1991 Recycling Annual, (Paper Age, 1991 Recycling Annual) describes its newsprint recycling and deinking process as cleaning and screening followed by a series of 3 washings facilitated by the addition of chemicals to emulsify the printing oils and resins. Again the aim of this process is to remove printing ink constituents including oils as completely as possible. This is especially important because the recycled newsprint fiber is made into blank newsprint paper which would not have adequate brightness or strength without removing the ink constituents.

A common component of deinking systems for newspaper waste involves separating ink from the fibers and removing the ink typically through washing and flotation steps. While conventional alkaline deinking chemicals are very effective in such deinking they have a known disadvantage of lowering brightness. Recent research has been directed to avoiding alkaline deinking chemicals in deinking systems.

Recent developments in wastepaper deinking (U.K. Patent Application 2,231,595 published Nov. 21, 1990 entitled "Deinking Water Printed Paper Using Enzymes" and a North Carolina State University publication entitled "Enzymatic Deinking of Flexographic Printed Newsprint: Black and Colored Inks") deal with the use of enzymes to aid in the detachment and removal of inks from the fibers. These processes describe the use of enzymes such as cellulase, pectinase, xylanase, and hemicellulases to facilitate ink removal without the negative effects of caustic treatment on brightness along with the use of flotation to remove the agglomerated ink particles. Since printing oils are lighter than water, they are readily removed by flotation treatment particularly in view of the chemicals added to aid in separation. While enzymes are used, this thorough removal of ink components is counter to the objective of the present invention which retains the oils for tissue softness.

A paper presented at the Fifth International Conference on Biotechnology from May 27 to May 30, 1992 in Kyoto Japan entitled "Enzyme Deinking of Newsprint Waste" by John A. Heitmann, Thomas W. Joyce and D. Y. Prasad described research occurring at the department of Wood and Paper Science, North Carolina State University, Raleigh, N.C. That article described the use of acidic flotation deinking systems in which the only chemicals used were enzymes, calcium chloride and a surfactant. The enzymes were a preparation containing both cellulase and hemicellulase. Increases in freeness and brightness were noted. However, the important distinction is that the acidic flotation deinking system described removes ink along with its associated oils which is contrary to the present invention.

More recently, high consistency pulping (13–18%) has been utilized for recycling old newspapers. This type of pulping technology utilizes the additional effect of rubbing/ kneading between the fibers/papers at higher consistency to defiber and assist in separating inks from the fibers. Generally the pulping temperature, time, and chemical additions are the same as lower consistency pulping described above.

The present invention avoids conventional deinking but instead retains a significant component of the ink, i.e., the printing ink oils. The present invention is based on the discovery that if the oily component of ink is not removed from coarse fibers in old newsprint, surprisingly high quality, soft tissue products can be produced. To accomplish this task, a formulation of enzymes is utilized to loosen a limited amount of the ink constituents for removal and/or redistribution on the fibers. In addition, by avoiding saponification conditions, e.g. alkaline saponification of fatty acid oils such as vegetable oils, and fiber components such as hemicellulose are not allowed to leach out of the fibers into the papermachine water system and cause difficulties with the creping operation.

SUMMARY OF THE INVENTION

The present invention provides a method of modifying coarse high yield type pulp into pulps suitable for making soft tissue type products. Coarse, low freeness high yield type pulp is typically found in newsprint and in accordance with the present invention can be modified to produce soft tissue products by retaining certain types of contaminants typically found in old newsprint on or in the fibers and subjecting the contaminated fibers to specific enzyme treatments preferably while the fibers are swelled in water and a surfactant. In contrast, the same fibers, when deinked to remove the oily contaminants do not produce soft tissue products. Virgin, coarse, high yield fibers (e.g. stone groundwood, thermomechanical and chemithermomechanical pulps) can be made suitable for producing soft tissue type products by addition of oils typically found as contaminants in old newsprint and subjecting the intentionally contaminated virgin fibers to appropriate enzyme treatment. Novel fibers and sanitary paper products containing a majority of enzyme treated coarse, high yield type fibers having oily contaminants are produced according to the present invention. Enzyme treatment utilizes one or more enzymes selected from the group consisting of cellulase, hemicellulase, such as xylanase, and lipase.

The method of making sanitary paper products from newspapers containing coarse cellulosic fibers and printed with ink containing oil, disclosed herein comprises:

(a) pulping said newspapers in water with agitation to produce a pulp slurry at a consistency between 3% and 12% and a pH below about 8.0;

(b) adding to the slurry an enzyme selected from the group consisting of cellulase, hemicullase and lipase and maintaining said pulp slurry at a temperature above about 100° F. for at least 15 minutes; and, (c) using said enzyme treated (and preferably also surfactant treated) pulp slurry as a major source of fibers in a papermaking process to produce sanitary paper products.

The novel sanitary paper product is made of cellulosic fibers at least 80% of which are coarse fibers having a Kajaani coarseness greater than 18 milligrams per 100 meters, and has a basis weight of between 7 pounds per ream and 40 pounds per ream, a Normalized Tensile Strength (metric) of between 5.0 and 20.0, and containing from 0.2% to 2.0% of an oil selected from the group consisting of vegetable oils and mineral oils.

The novel method of modifying cellulosic fibers comprises modifying cellulosic fibers to improve their tissue and towel making properties comprising:

(a) adding between 0.2% and 2.0% of a mineral oil or a vegetable oil to the coarse cellulosic fibers either prior to forming such papermaking furnish or, with agitation directly to said furnish; and, (b) adding to the furnish at a temperature below 140° F., an enzyme selected from the group consisting of cellulase, hemicellulase and lipase, and maintaining the pulp in contact with said enzyme (and preferably also with a surfactant) at a consistency of between 3% and 12% and at a temperature between 100 and 140° F. for at least 15 minutes.

The improved cellulosic fiber for making sanitary paper products disclosed herein comprises an enzyme modified cellulosic fiber having a Kajaani fiber coarseness greater than 18 mg/100 meters and containing between 0.2% and 2.0% of oil selected from the group consisting of vegetable oils and mineral oils.

DESCRIPTION OF THE INVENTION AND PREFERRED EMBODIMENT

Figure 1:
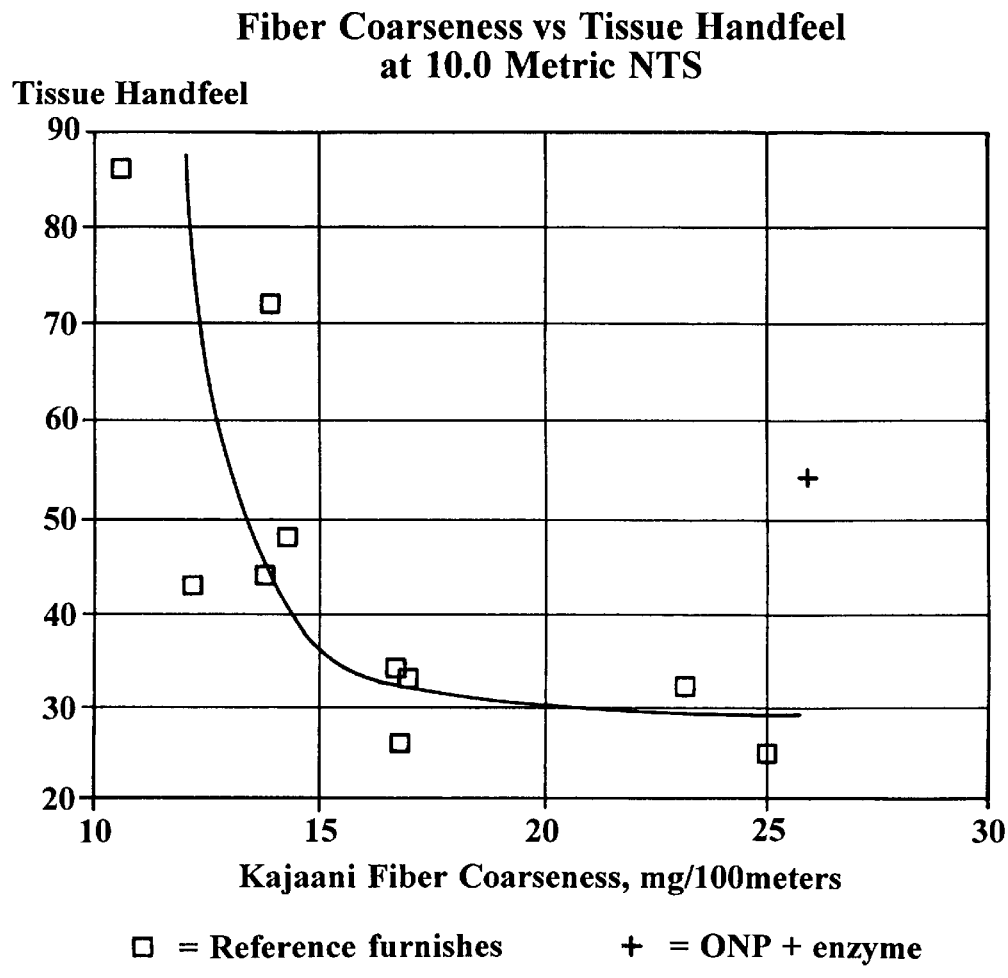
FIG. 1 graphically shows the relationship between fiber coarseness and tissue softness conventionally obtained by lightweight, dry crepe tissue making processes and the superior results obtained by the present invention. Tables I, II and III are tabular presentation of the experimental results of examples 1, 2 and 3.

The present invention is based upon the discovery that coarse high yield type fibers (i.e. fibers produced by predominantly mechanical separation of wood fibers and typically containing at least 80% by weight of the source material) can produce very soft tissue type products having product qualities comparable to tissue products made from expensive bleached northern softwood kraft fibers. Particularly, soft tissue type products can be produced from old newspapers (ONP) by retaining certain oil contaminants typically found in used newspapers, subjecting the used newspaper fibers containing such contaminants to an enzyme treatment and making paper with such oil contaminated and enzyme modified fibers. It is critical in the practice of the present invention that a sufficient quantity of oils typically found in used newspapers be on or in the fibers prior to making tissue or other types of sanitary paper products (e.g. towels, napkins and facial tissues) from such fibers. Furthermore, if the oil is removed during deinking or not present as with virgin fibers, the oil can be added to the fibers and the fibers containing such oils can then be subjected to an enzyme treatment prior to making sanitary paper products from the oiled and enzyme modified fibers to obtain the benefits of the present invention.

Vegetable oils and mineral oils are typically used in newspaper inks and are found in used newspapers generally as components of the printing inks. In order to retain oil components of used newspapers, conventional repulping and deinking process must be modified. The preferred modification of conventional deinking is to eliminate saponification conditions in which vegetable type oils (or any oil containing an ester group) are converted into soaps. However, if the oils, are removed during deinking, they can be replaced prior to enzyme treatment.

The method of practicing the present invention when beginning with used newspapers broadly consists of: (1) pulping the newspaper by slurrying the newspapers in water with agitation; (2) treating the used newspaper pulp slurry with an enzyme such as a cellulase, xylanase or lipase or a combination of such enzymes and preferably in combination with a surfactant; (3) maintaining the pH of the slurried pulp below about 8.0; and (4) utilizing the slurried enzyme treated pulp as part of the furnish in a sanitary paper manufacturing process, preferably a tissue papermaking process. While screening, cleaning, flotation and some washing of the pulp slurry may be practiced prior to using it as a furnish for making sanitary paper products (e.g. tissue, towel, facial tissues or napkins) it is important that a substantial quantity of the oily contaminants be retained on the pulp after such screening, cleaning, flotation and washing steps or else replaced prior to enzyme treatment and papermaking.

Preferably the slurrying and enzyme treatment steps are conducted in several stages beginning with slurrying the newsprint at a consistency of between about 3% and 12% with or without surfactant, and preferably at a temperature of the pulp slurry above about 100° F. and preferably about 180° F. and maintaining it at said elevated temperature for at least about 15 minutes. This is followed by adjusting the pH and reducing the temperature of the pulp slurry to a temperature and pH suitable for maintaining active enzyme conditions. Preferred enzyme treatment conditions are a pH of 4 to 7 and a temperature below about 140° F. and preferably elevated above about 100° F. If pulping of the newspapers is performed under conditions also suitable for enzyme treatment, pulping and enzyme treatment steps can be combined. When pulping and enzyme treatment are combined into a single step, the enzyme with or without a surfactant can be added to the water either prior to or after addition of the newspapers for pulping. Preferably a surfactant of the type typically used in contaminant removal in newsprint recycling processes is added to the pulp slurry. One or more enzymes can be used and preferably selected from the group consisting of cellulase, xylanase and lipase. The pulp is maintained in contact with the enzyme for at least about 15 minutes and preferably about 30 minutes. Although longer contact times for the pulp with the enzyme can be used it is not needed. Contact times for the pulp and enzyme longer than 30 minutes would be helpful when lower amounts of enzymes are used.

The critical component in the above process sequence is having oils of the type typically found in newspaper printing inks in contact with the fibers simultaneously with the enzyme treatment and retained with (on or in) the fibers during papermaking. Without being bound thereby, our theory by which coarse fibers become very suitable for making soft tissue type sanitary paper products is that some interaction between the fibers, oils and enzymes occurs that is enhanced by the presence of a surfactant. This interaction synergistically improves the tissue making properties of the coarse fibers despite the fact that the fibers remain coarse.

The pulping process of the present invention preferably involves pulping old newspapers (ONP) at 6–9% consistency and an elevated temperature with a preferred range of 120° F.–180° F. Pulping time can range from 15–60 minutes. The slurry is then cooled to 120° F.–140° F. and transfered to a holding chest/blend chest where the pH is adjusted to a pH between pH 4 and 7. A deinking surfactant, suitable for low pH ranges, is then added, preferably prior to the addition of enzymes. Enzymes are added to the pulp slurry and allowed to react with the fibers and the oil for a reaction period of at least 15 minutes and preferably for about 30 minutes. The pH of the slurry is then adjusted to 7 and the pulp is then ready for the papermaking process. Additional screening is not needed although screening and/or centrifugal cleaning may be practiced to remove large contaminants, e.g. paper clips, to protect the papermachine. Optionally, limited washing of the enzyme treated and oil contaminated pulp can be done on the papermachine by using the unwashed pulp in a papermaking furnish on a papermachine. If the pulp slurry is not washed prior to the papermachine, free floating and dissolved material can be washed out on the papermachine forming fabric and removed from the papermachine whitewater by utilizing a flotation step for contaminant removal of papermachine whitewater. This can be done by using a sidehill screen and dissolved air flotation process, such as a Krofta clarifier, to clarify the whitewater for reuse on the papermachine.

Dyes

Recycled newsprint fibers of the present invention retain inky contaminants and are therefore a light gray color. Tissue products made with a majority of such fibers are preferably dyed to a more pleasant color. The dyes useful in this invention must-be water soluble and because of the difficulty of uniformity dying oily contaminated fibers, the dyes should be substantive to cellulosic fibers. They should also be cationic, i.e. they will form positively—charged colored cations when dissociated in water. These dyes are particularly well suited for dyeing mechanical and unbleached chemical pulps. Such pulp fibers contain a significant number of acid groups, with which the positively-charged cations can react by salt formation. These dyes can be selected from among the basic dyes, a group well known from prior art, in which the basic group is an integral part of the chromophore, or from the newer class of cationic direct dyes, in which the basic group lies outside of the molecules resonance system. The dye is preferably added in amounts ranging from 0.01% to 3%, most usefully, at 0.05 to 0.5% on the weight of air dry fiber.

These dyes can be applied at any normal papermaking pH, either acidic or neutral. Their excellent affinity for unbleached fibers allows them to be added to the papermaking system as late as the inlet to the fan pump, but a longer residence time, e.g., introduction at the suction side of the machine chest transfer pump would be preferred. In either case a thick stock location with good mixing is desirable.

Enzymes

Suitable enzymes for use in the present invention should be selected from the group consisting of cellulase, hemicellulase (e.g. xylanase), or lipase enzymes and preferably one of each type is used in combination. Each type of enzyme functionally targets different components of used newspaper fibers and/or contaminants usually associated with such fibers. Cellulase enzymes contribute to ink removal by attacking the cellulose component of fibers in the proximity of ink. Xylanase and other hemicellulases attack hemicellulose components of fibers for brightness enhancement while lipase attacks resins in the fibers and in the ink formulations.

When all three types of enzymes are used together a synergism results, that achieves better ink removal as well as eliminating so called "stickies". Stickies are a well known contaminant in used paper resulting from adhesives, pressure sensitive labels, etc. and are known to cause papermachine runability problems. A mixture is preferably selected of enzymes that will attack the printed waste paper in a way that enhances tissue softness and modifies contaminants so that they do not hurt papermachine operation. Also, enzyme treated pulp in accordance with the present invention will improve paper machine running ability and produce a superior product at low costs.

Hemicellulase is a general term describing various types of enzymes each degrading specific types of compounds commonly known as hemicellulose and found in wood and other plant materials. Xylanase is the preferred hemicellulase enzyme because it is active toward the xylan, a common type of hemicellulose. The constituents of hemicellulose differ from plant to plant. The most abundant of the wood hemicelluloses are the xylans, which are polymers of 1,4-linked β-D-xylopyranose units some of which bear short side chains such as 1,3-linked α-1-arabinofuranose units or esterified 1,2-linked α-d-glucuronic acid units. Also important, particularly in softwoods, are 1,4-β-D-glucomannans with randomly distributed glucose and mannose units, bearing side chains such as 1,6-linked α-D-galactopyranose units. Hemicellulose differs from cellulose in three important respects. In the first place they contain several different sugar units whereas cellulose contains only 1,4-β-D-glucopyranose units. Secondly they exhibit a considerable degree of chain branching, whereas cellulose is a strictly linear polymer. Thirdly, the degree of polymerization of native cellulose is ten to one hundred times greater than that of most hemicelluloses. The term "hemicellulase" refers to any specific enzyme class that reacts with a specific hemicellulose and as such, hemicellulase is not a specific enzyme class but a generic term of art for a group of enzyme classes. Xylanase is a specific enzyme class that attacks xylan and therefore xylanase falls within the general term "hemicellulase."

Many types of enzymes could be used within classes of enzymes known as cellulase, xylanase (or other hemicellulase) and lipase. Cellulase has the most commercial choices available because it comes from many different sources, such as from *Aspergillis niger, Trichoderma reesei, T. viride, T. koningi, F. solani, Penicillium pinophilum, P. funiculosum*. It is preferred to use a cellulase that poses endo-exo glucanase functionality to attack both amorphous and crystalline regions of cellulose so that the enzyme can attack any place on the cellulosic surface where ink is attached.

The preferred cellulase is a product sold under the trademark Celluclast® 1.5 L, by Enzyme Process Division, Bioindustrial Group, Novo Nordisk A/S, Novo Allé, 2880 Bagsvaerd, Denmark. Celluclast 1.5 L is a liquid cellulase preparation made by submerged fermentation of a selected strain of the fungus "*Trichoderma reesei*." The enzyme catalyzes the breakdown of cellulose into glucose, cellobiose and higher glucose polymers. The relative amounts of reaction products formed depend on the reaction conditions. Celluclast 1.5 L has an enzyme activity of 1500 NCU/g and is a brown liquid with a density of approximately 1.2 g/ml. Activity is determined on the basis of Novo Cellulase Units (NCU). One NCU is the amount of enzyme which, under standard conditions, degrades carboxy methylcellulose to reducing carbohydrates with a reduction power corresponding to 1 micromole (umol) glucose per minute. Standard conditions are: Substrate—carboxymethyl-cellulose (CMC Hercules-7LFD); Temperature—40° C.; pH—4.8; Reaction time—20 minutes.

Xylanase can be obtained from a source such as *A. pullulans*, or *Streptomyces lividans*, or *Streptomyces roseiscleroticus*. Its purpose is to attack the xylan portion of the lignocellulose fiber which is considered to link the white colored cellulose with the brown colored lignin. Therefore, the attack on xylan hemicellulose enhances the removal of lignin, thus making the fiber brighter. It is not necessary that the xylanase be cellulase free or from any particular biosource. In this respect, mushroom enzyme (multiple enzymes found after mushroom growing) could be used without purification.

One preferred xylanase enzyme is Pulpzyme® HA which is a xylanase preparation derived from a selected strain of *Trichoderma reesei* available from Enzyme Process Division, Bioindustrial Group, Novo Nordisk A/S, Novo Allé, 2880 Bagsvaerd, Denmark. Pulpzyme® HA contains endo-1,4-beta-D-xylanase (EC 3.2.1.8) as well as exo-1,4-beta-D-xylanase (EC 3.2.1.37) activities. Pulpzyme® HA has a certain amount of cellulase activity in addition to its xylannase activity.

Pulpzyme® HA is a brown liquid preparation of a xylanase having an activity of 500 XYU/g and containing approximately 300 endo-glucanase activity units (EGU/g). One xylanase activity unit (XYU) is defined as the amount of enzyme which under standard conditions (pH 3.8, 30° C., 20 min. incubation) degrades larchwood xylan to reducing carbohydrates with a reducing power corresponding to 1 umol xylose. One endo-glucanase unit (EGU) is defined as the amount of enzyme which under standard conditions (pH 6.0, 40° C., 30 min. incubation) lowers the viscosity of a carboxymethyl cellulose solution to the same extent as an enzyme standard defining 1 EGU. Pulpzyme® HA has a very low activity towards crystalline cellulose.

Another preferred xylanase is Pulpzyme® HB which is a xylanase preparation derived from a selected strain of bacterial origin. It is available from Enzyme Process Division, Bioindustrial Group, Novo Nordisk A/S, Novo Allé, 2880 Bagsvaerd, Denmark. It contains endo-1,4-beta-D-xylanase activity (EC 3.2.1.8), and is virtually free of cellulase activity. Pulpzyme® HB is commercially available as a brown liquid preparation, having an endo-xylanase activity of 600 EXU/g in which one endo-xylanase activity unit (EXU) is defined as the amount of enzyme which, under standard conditions (pH 9.0, 50° C., 30 min. incubation), degrades RBB xylan.

Lipase can come from *Pseudomonas fragi, Candida cylindricea, Mucor javanicus, Pseudomonas fluorescens, Rhizopus javanicus, Rhizopus delemar, Rhizopus niveus*, and various species of Miehei, Myriococuum, Humicola, Aspergillus, Hyphozyma, and Bacillus. These have both lipase and esterase activities, and they are known to degrade triglyceride in wood resin into glycerol and fatty acids. As such the lipase enzymes could attack the vegetable oil component of the ink directly. The glycerol by product of lipase activity could help to make the cellulose softer.

Preferred lipase enzyme is Resinase® A 2X, which is a liquid lipase preparation for the hydrolysis of ester constituents of wood resin. Resinase® A 2X is commercially available from Enzyme Process Division, Bioindustrial Group, Novo Nordisk A/S, Novo Allé, 2880 Bagsvaerd, Denmark as a brown liquid preparation with an activity of 100 KLU/g. The lipase activity is measured in Kilo Lipase Units (KLU). One KLU is the amount of enzyme activity which liberates one millimole butyric acid per minute from an emulsion of tributyrin at a temperature of 30° C. and a pH of 7.0. The analysis is made in a pH-stat system in which the liberated acid is titrated continuously by addition of sodium hydroxide. The enzyme is not substrate-limited during the analysis.

Other enzymes could also be used in combination with these three types of preferred enzymes. They are ligninase, laccase, pectinase, protease and mannanase. Also, enzymes could be obtained from DNA altered and engineered microorganisms which express more of specific enzymes or more volumes to get better economy.

The preferred amount and combination of enzymes is 1.33 kg.cellulase/ton (2,000 lbs) of pulp for cellulase, 0.33 kg. xylanase/ton, and 0.33 kg. lipase/ton. As low as 0.25 kilograms of enzymes per ton of pulp (kg/ton) to as high as 25 kg/ton of pulp can be used as the total amount of all enzymes. However, 1 to 3 kg/ton total of all enzymes is a particularly preferred usage rate. The preferred range for each enzyme is: cellulase, 0.25 to 10, kg/ton; xylanase, 0.05 to 2.5, kg/ton; and lipase, 0.05 to 2.5, kg/ton.

Swelling of the fiber structure improves the enzyme action by assisting the penetration of the large enzyme molecules into the fiber. Elevated temperature (e.g. above ambient and below 140° F.), use of surfactant, and acid or mild alkaline chemicals can be used in pulping the newsprint to physically open up the lignocellulosic fiber structures so that enzymes can better penetrate the structures and perform their respective functions. If high pulping temperatures are used e.g. above about 140° F., the temperature must be lowered to a temperature suitable for enzyme treatment before the enzymes used are added. For most enzymes, the suitable temperature is less than about 140° F.

Surfactant Use With Enzyme Treatment

A synergistic result is obtained with the combination of a surfactant and an enzyme. The minimum effective amount of surfactant to obtain synergy, is the amount needed to open up the fiber rather than the higher levels used for solubilizing oils by emulsifying the oily contaminants. The preferred amount of surfactant is from 0.025% to 0.1% based on the weight of fibers. Nonionic surfactants are preferred for addition to the enzyme treatment step to improve the enzymatic action for a better handfeel improvement. A preferred nonionic surfactant is commercially available as DI600® from High Point Chemical Corp. DI6000 is an alkoxylated fatty acid, nonionic surfactant specifically developed for flotation type deinking of newsprint. Other nonionic surfactants well known in the art of deinking could be used, such as: Alkyl phenyl ether of polyethylene glycol, e.g. Union Carbide's Tergitol® series of surfactants; alkylphenolethylene oxide condensation products, e.g. Rhone Poulenc, Incorporated's Igepal® series of surfactants; aryl alkyl polyether alcohol, e.g. Rohm and Haas's Triton® X 400 series of surfactants such as Triton X-100. In some cases an anionic surfactant may be used depending on the contaminants present in the wastepaper. Examples of suitable anionic surfactants are: ammonium or sodium salts of a sulfated ethoxylate derived from a 12 to 14 carbon linear primary alcohol such as Vista's Alfonic® 1412A or 1412S; and, sulfonated napthalene formaldehyde condensates, e.g. Rohm and Haas's Tamol® SN. In some cases, a cationic surfactant can be used, especially when debonding is also desired. Suitable cationic surfactants include imidazole compounds e.g., CIBA-GEIGY's Amasoft® 16-7 and Sapamine® P quaternary ammonium compounds; Quaker Chemicals' Quaker® 2001; and American Cyanamid's Cyanatex®.

Oil Types

Oils of the type typically used in printing, particularly printing of newspapers and in the formulation of ink for such printing, are suitable for practice in the present invention. Mineral oils and vegetable oils are the most common types of oils used in formulating printing inks for newspapers. Mineral oil, also known as white mineral oil, alboline, paraffine, Nujol, Saxol, and lignite oil, is generally classified as CAS #64742-46-7. While historically such oils may have been derived from various sources, commercially they are typically a petroleum distillate fraction with a carbon chain averaging from about 10 to about 14 carbon atoms and usually a mixture of paraffinic hydrocarbons, napthenic hydrocarbons and alkylated aromatic hydrocarbons. Such oils have a specific gravity of about 0.8 to about 0.85, a viscosity at 100° F. of 38–41 SSU (Saybolt Universal Units) and an initial boiling point of about 500° F. (260° C.). Vegetable oils of the type typically used in formulating printing inks can be derived from various sources. Typical is an oil derived from soy beans known as Soya oil, Chinese bean oil, soy bean oil, or just plain soy oil with a chemical abstract service designation CAS #8001-22-7. Such oils are saponifiable with a saponification value of about 185 to 195, a solidifying point of about 5° F. to about 18° F., a melting point of about 70 to about 90° F. and an Iodine value of about 135 to 145. Other vegetable sources of oil and other types of oil suitable for use in printing inks can also be used in the practice of the present invention.

Oil Content

The amount of oil that should be on the fibers (whether on the surface or within the structure of the cellulosic fibers) should be from about 0.2% to about 2%. Preferably, this oil content is obtained by not saponifying or solubilizing oils on used newspapers during pulping and treating the used newspapers and preparing them for use in a papermaking furnish. It is also preferred that a surfactant, if used, be used in moderation so as not to wash off oils while preparing newsprint for use in a papermaking furnish for sanitary paper products. However, as can be seen from the examples, oil can be added to used newspapers or virgin fibers by adding oil onto the pulp prior to slurrying or by adding the oil into a water slurry of the fibers so that the oil comes in contact with the fibers prior to subjecting the fibers to enzyme treatment in accordance with the disclosure herein. Therefore, virgin fibers can be used in the practice of the present invention and the present invention in its broadest concept is not restricted to recycling of old newspapers as the source of fibers for practicing the invention. In its broadest concept, the invention requires the presence of oils on or in the fibers from about 0.2% to about 2.0% at the time the fibers are subjected to enzyme treatment. The fibers with the oil are subjected to the enzyme treatment as discussed above and then used in a papermaking furnish.

While the synergistic effect obtained with oils and enzyme treatment of cellulosic fibers, is most beneficial to high yield fibers, other cellulosic fibers would have their sanitary qualities enhanced by the process of the present invention so that softer more flexible sanitary paper products could be made from such fibers. Such fibers include both northern and southern softwood and hardwood kraft, both bleached and unbleached, bleached and unbleached sulfite fibers in addition to the bleached and unbleached high yield fibers such as stone groundwood fibers, thermomechanical fibers and chemithermomechanical pulp fibers. Specific examples of such fibers are: bleached softwood chemithermomechanical pulp (SWCTMP); bleached northern softwood kraft (NSWK); bleached recycled fiber (RF); bleached eucalyptus kraft pulp (BEK); bleached southern softwood kraft (SSWK); and bleached hardwood chemithermomechanical pulp (HWCTMP).

The oil containing, enzyme treated fibers of the present invention can be used in conventional papermaking processes for the production of sanitary paper products including toilet tissue grade paper, facial tissue grade paper, paper towels and paper napkins in accordance with any conventional process for the production of such products. The softness and bulk of such products would be improved by the use of oil containing and enzyme treated fibers of the present invention. Because of the bulk improvements, paper towels produced with fibers of the present invention would be enhanced.

The present invention is based on the discovery that conventional deinking is counterproductive to making of soft tissue products from used newspapers because it removes oil that can be beneficial to softness of tissue and towel products. Softness is difficult to measure or quantify for tissue products because softness is perceived by the user by handfeel which is influenced by smoothness and other surface characteristics in addition to sheet puffiness. Handfeel tests have been developed and handfeel data reported herein has been obtained using the following test:

Handfeel Test

Scope

Several different lightweight, dry crepe tissues for use as standards were produced from commercially available pulp of differing qualities for imparting softness to tissue products and were used to define a numerical softness scale. A numerical value was assigned to the softness of each tissue standard. The softest product was assigned a handfeel value of 86, and was a lightweight, dry crepe tissue produced with 50% Irving northern softwood kraft fibers and 50% Sante Fe Eucalyptus kraft pulp. The harshest product for use as a standard was produced with 100% bleached softwood chemithermomechanical pulp, (SWCTMP) and was assigned a handfeel value of 20 on the scale. Other lightweight, dry crepe tissue samples for use as standards in defining the "Handfeel Softness" scale and having softness qualities between the softest and harshest tissue standards were produced from different pulp or pulp blends and were assigned handfeel softness values between 20 and 86. The pulps used are further described in the following paragraphs. Pulp blends and fiber coarsenesses of the pulp blends used to produce additional tissue standards are given in Table III along with the tensile strength of each tissue standard. Tissue manufacturing processes other than the lightweight, dry crepe process and other pulp fibers than those used to produce the standards are capable of producing tissue products outside of the 20 to 86 handfeel softness scale defined by tissue standards described herein. However, for the purpose of establishing the improvement in softness achievable with the present invention, the above defined handfeel softness range of 20 to 86 for lightweight, dry crepe products is accurate and sufficient for comparative purposes. Recycled newsprint fibers of the present invention could produce tissue products having softness values higher than 86 when used in other tissue making process such as the through-dried process or when blended with other fibers.

Pulps Used To Produce Handfeel Standards (a) Bleached softwood chemithermomechanical pulp (SWCTMP) (Temcell grade 500/80) having a Canadian Standard Freeness (CSF) of 500 and an ISO brightness of 80 was made from Black spruce and Balsam fir. Pulping was with sodium sulfite pretreatment and pressurized refining followed by alkaline peroxide bleaching to 80°ISO brightness. Kajaani coarseness of the fibers equaled 27.8 mg/100 meters and the Kajaani weight average fiber length was 1.7 mm.

(b) Bleached northern softwood kraft (NSWK) (Pictou grade 100/0–100% softwood) was made from Black spruce and Balsam fir. Pulping was by the kraft process to Kappa#= 28 followed by $CE_ODED$ bleaching to 88°ISO brightness. Kajaani coarseness equaled 14.3 mg/100 meters and Kajaani weight average fiber length was 2.2 mm.

(c) Bleached recycled fiber (RF) was made from sorted mixed office waste that was pulped, screened, cleaned, and washed to 550°CSF followed by bleaching with sodium hypochlorite to 80°ISO brightness. Kajaani coarseness equaled 12.2 mg/100 meters and Kajaani weight average fiber length was 1.2 mm.

(d) Bleached eucalyptus kraft pulp (BEK) (Santa Fe elemental chlorine free grade) was made from Eucalyptus Globulus pulped to Kappa#=12 by the kraft process followed by $ODE_OD$ bleaching to 89°ISO brightness. Kajaani coarseness equaled 6.8 mg/100 meters and Kajaani weight average fiber length was 0.85 mm.

(e) Bleached southern softwood kraft (SSWK) (Scott Mobile pine) was made from Loblolly and Slash pine and pulped to Kappa#=26 followed by CEHED bleaching to 86°ISO brightness. Kajaani coarseness equaled 27.8 mg/100 meters and Kajaani weight average fiber length was 2.6 mm.

(f) Bleached Hardwood Chemithermomechanical Pulp (HWCTMP) (Millar Western grade 450/83/100) having a Canadian Standard Freeness (CSF) of 450 and an ISO brightness of 83 was made from quaking aspen. Pulping was with alkaline peroxide pretreatment and pressurized refining followed by alkaline peroxide bleaching. Kajaani coarseness of the fibers equaled 13.8 mg/100 meters and the Kajaani weight average fiber length was 0.85 mm.

Apparatus

The test method requires no apparatus. The test method uses the procedures and materials described below to evaluate tissue samples using a panel of ten or more people and rank softness of the samples on the softness scale using the product standards of known softness scale values.

Sample Preparation

1. Five samples to be tested by the panel of evaluators (judges) should be selected.

2. Calculate the number of sample pads and pads of standard samples needed for the test panel of judges for each product to be evaluated for softness using the following equation:

$$\text{Pads needed (each product)} = (x-1) \times (y)$$

x=number of products to be tested
y=number of persons on the test panel

3. Randomly select a roll of sample tissue for each product being evaluated and discard the first few sheets (to get rid of the tail tying glue).

4. Prepare sample pads from each roll of product being tested. Each pad should be 4 sheets thick and made from a continuous sample of tissue that is four sheets long. Each pad is made as follows: the four sheet long sample is first folded in half. This results in a double thickness sample that is 2 sheets long. The double thickness sample is then folded in half again to produce a 4 sheet thick, single sheet long sample pad. The folding should be done so that the outside surface of the sheets when it was on the roll of tissue becomes the outside surfaces of the pad. If a product being tested is "two-sided", that is it has different surface characteristics on the outside surface of the sheet versus the surface facing the inside of the roll then the product should be tested twice, once with the surface facing the outside of the roll as the outer surface of the sample pad and also tested with a separate sample pad prepared in which the folding results in the sheet surface facing the inside of the roll becoming the outer surface of the sample pad.

5. Make up the required number of pads from each product using the formula in paragraph 2 above. If more than one roll of a product is needed to prepare the required number of pads, then it is important that stacks of pads be randomized with product from each of the rolls. Code each pad with the batch code in the top left hand corner (on the fold).

6. Select three standards to be used as references by the panel from among the standard tissues as follows:

Select the coarsest sample being evaluated and compare it to standard tissue sample pads and select a lower standard that is slightly coarser than the coarsest sample.

Select the softest sample of product being evaluated and select a standard tissue pad that is slightly higher (softer) than the softest sample being evaluated.

Select a third standard which falls approximately in the middle of the lower and higher standards selected.

The three standard tissue pads selected become the handfeel references for the panel and define the softest, coarsest and midrange.

7. The handfeel references bracket the softness range of the products being evaluated by the panel. For greater accuracy, the highest and lowest references selected should be approximately 30 points apart on the Handfeel Softness Scale. The middle reference should be eight or more points apart from the lower and higher references.

Panel Member Selection and Instruction

1. Select a panel of about 10 people having about the same number of males and females and with age variations.

2. Ensure the panel members understand the instructions and if necessary, give a "trial run".

3. Panels should be conducted in a quiet location.

Test Procedures

1. Begin the softness test by reading the following Standard Instructions.

Standard Instructions

These instructions are to be read to each panel participant before beginning the softness panel test procedure.

a. Purpose

"The purpose of this procedure is to compare the softness of toilet tissue samples."

b. Method

"You will be given two sample pads of toilet tissue at a time. Compare the two to each other using your dominant hand and make the comparison by feeling each sample with your dominant hand. You may stroke, bend, or crunch the samples as you see fit for making your judgment."

c. First Decision

"After feeling each of the two sample pads pair, you are asked to decide which sample is softer."

d. Second Decision

"Rate the degree of difference in softness between the two pads using the following rating:

The scale uses odd numbers 1, 3, 5, 7, 9. You may use even numbers if you feel that the numbers listed do not fully represent the difference between two products."

PANEL RATING SCALE

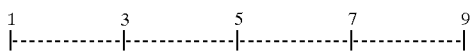

The numbers on the rating scale are defined as:
1. No difference
3. Very small difference, not confident, someone could miss it
5. Small difference, confident about judgment
7. Moderate difference, easy to detect, confident
9. Very large difference, very easy to detect, memorable e. Calibration "Before we start I will give you an example of the softest standard to be used for comparison and a sample pad of the least soft (coarsest standard) products. Please handle both. The difference in softness you feel between the two standard references you will rate on the definition scale as 9." (The 9 on the rating scale is the equivalent to the number of handfeel points on the softness scale between the higher and lower references selected for the panel in step 6.)

f. Participant Reaction

"Do you have any questions about the test procedure?"

g. Reassurance

"Finally, don't agonize too long over each decision. Your opinion is as good as anybody else's. There are no right or wrong answers!"

2. Present every combination of sample pads and reference pads to each panel member and ask them to select the preferred sample and then rank the difference using the 1 to 9 rating scale of softness. Each panel member should receive the pairs in random order to avoid sequence errors.

3. Record the results of each pair as XYn. Where X is the preferred sample code, Y is the non-preferred sample code and n is the scale value (1 to 9).

Data Analysis

The paired comparison results are treated as if they belong to a ratio scale. The definition of a ratio scale is given as follows: A scale is a ratio scale if this scale is invariant under positive linear transformations of the form y=ax, a>0.

The data pairs and ratio weights for "n" number of pads are loaded into a square matrix A of the following form.

$$\begin{array}{c} & \begin{array}{ccc} O_1 & O_2 & \ldots & O_n \end{array} \\ \begin{array}{c} O_1 \\ O_2 \\ O_n \end{array} & \begin{bmatrix} \frac{W_1}{W_1} & \frac{W_1}{W_2} & \frac{W_1}{W_n} \\ \frac{W_2}{W_1} & \frac{W_2}{W_2} & \frac{W_2}{W_n} \\ \frac{W_n}{W_1} & \frac{W_n}{W_2} & \frac{W_n}{W_n} \end{bmatrix} \end{array}$$

Where $O_i$ are the individual samples and $W_i$ are the scale values (ratio weights) for each pair.

For square matrices of this type the following property exists $$A\vec{W}=M\vec{W}$$

Where $\vec{W}=(W_1, W_2, \ldots W_n)$. The weight vector $\vec{W}$ is the eigen vector of the matrix A corresponding to its eigen value n. Saaty has shown (See, Saaty, T. L. "A Scaling Method for Priorities in Hierarchical Structures", *Journal of Mathematical Psychology*, 15, 234–281 (1977) and Saaty, T. L., "Measuring the Fuzziness of Sets", *Journal of Cybernetics*, 4(4), 53–61 (1974)) that to extract the eigen vector $\vec{W}$ from the estimated weights requires finding the largest eigen value of A (λ max). A computer program to solve for λ max and $\vec{W}$ is provided in McConnell, Wes, "Product Development Using Fuzzy Sets", INDA Tenth Technical Symposium, pp 55–72, Nov. 17–19, 1982. The resulting eigen vector $\vec{W}$ is the best estimate ratio scale of the paired inputs. Taking the log of each element in this vector creates the more familiar equal interval scale in which the distances between objects are linear. The standard softness values are plotted versus the estimated equal interval scale values and the unknown samples are assigned numerical values by interpolation.

The mean and standard deviation of the standard softness values of each unknown sample are calculated from the calculated standard softness values for all panel members. If any individual panel member value falls outside of 2 standard deviations from the mean, that value is discarded and the mean and standard deviation are recalculated. The mean of the standard softness values with no values outside of 2 standard deviations from the mean is the standard handfeel softness value for that unknown sample.

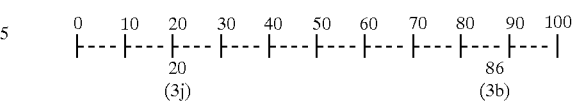

HANDFEEL SOFTNESS SCALE

Tensile Strength

Tensile strength values given herein for tissue type paper products are measured by a breaking length test (TAPPI Test Method No. T494om-88) using 5.08 cm. sample span and 5.08 cm/minute cross head speed. Typically, tissue strengths are different in the machine direction versus cross machine direction of the sheet. Also, the basis weight of tissue samples vary which affects tensile strength. In order to better compare tensile strengths from various tissue samples it is important to compensate for the differences in basis weight of the samples and for machine directional differences in tensile strength. This compensation is achieved by calculating a "Basis Weight and Directionally Normalized Tensile Strength" (hereinafter "Normalized Tensile Strength" or "NTS"). NTS is calculated as the quotient obtained by dividing the square root of the product of the machine direction and cross machine direction tensile strengths by the basis weight. Tensile strength calculations normalized for differences in basis weight and machine direction have been devised for better comparisons of tissue samples. Tensile strengths are measured in both the machine direction and cross machine direction and the basis weight for the tissue sample is measured in accordance with TAPPI Test Method No. T410om-88. When English units of measurement are used, tensile strength is measured in ounces per inch and basis weight in pounds per ream (2880 square feet). When calculated in metric units the tensile strength is measured in grams per 2.54 centimeters and the basis weight is measured in grams per square meter. It should be noted that the metric units are not pure metric units because the test apparatus used for testing tensile is set up to cut a sample in inches and accordingly the metric units comes out to be grams per 2.54 centimeters. Using the abbreviations MDT for machine direction tensile, CDT for cross machine direction tensile and BW for basis weight, the mathematical calculation of Basis Weight and Directionally Normalized Tensile strength (NTS) is:

$$NTS=(MDT \times CDT)^{1/2}/BW$$

NTS in English units=0:060×the NTS in the above defined metric units.

Tissue Making Process

The oil containing enzyme modified fibers of the present invention may be used in any commonly known papermaking process for producing, soft, bulky, sanitary paper webs such as tissue, towel, napkins and facial tissue. Many different papermaking processes including those processes wherein the web is dried via can drying, through drying, thermal drying, and combinations thereof are suitable. Exemplary of the types of papermaking processes which might be used in conjunction with the present invention are those processes taught in U.S. Pat. No. 3,301,746 to Sanford et al., U.S. Pat. No. 3,821,068 to Shaw, U.S. Pat. No. 3,812,000 to Salvucci et al., U.S. Pat. No. 3,994,771 to Morgan, Jr. et al., U.S. Pat. No. 4,102,737 to Morton, U.S. Pat. No. 4,158,594 to Becker et al., U.S. Pat. No. 4,440,597 to Wells et al., and U.S. Pat. No. 5,048,589 to Cook et al.

The preferred papermaking process is commonly known as the dry crepe process. Generally this involves using the paper furnish of the present invention to which dry strength chemicals are preferably added to generate tensile strength and other papermaking chemicals may be added. The paper furnish is then pumped from a machine chest and flows to a headbox and through a slice at 0.1 to 0.4% consistency onto a horizontal surface of a Fourdrinier wire through which water is withdrawn and web formation takes place. The wire cloth is entrained around a breast roll and several table rolls, then to a wire turning roll from which it is fed around a couch roll and several guide rolls back to the breast roll. One of the rolls is driven to propel the Fourdrinier wire. One or more vacuum boxes, deflectors or hydrofoils may be used between the table rolls to enhance water removal.

The wet web is formed on the upper surface of the Fourdrinier and transferred to a felt by pressing the web onto the felt by means of a couch roll or transferring the sheet to the felt by means of a pick-up shoe. The felt transports the web to a press assembly. The felt then moves around one or two press rolls, one of which may be a suction roll, and then is entrained around guide rolls and rotates back to the couch roll. Showers and guard boards can be used at various positions on the felt surface to assist in web pick-up, cleaning and conditioning the felt surface. The press assembly comprises either a single press roll or an upper and lower press roll. Moisture is removed in the nip of the press assembly and transferred into the felt.

The formed and pressed web is transferred to the surface of a rotating drying cylinder, referred to as a yankee dryer. The drying assembly may also include a hot air hood surrounding the upper portion of the yankee cylinder. The hood has hot air nozzles which impinge on the web and assist in moisture removal. The hood includes an exhaust to remove air from the hood chamber to control temperature. The web is removed from the drying surface using a doctor blade to impart crepe to the web. To assist in removing the web from the drying surface in a controlled, uniform state, a creping adhesive is applied to yankee surface using a spray system. The spray system is a series of spray nozzles attached to a header pipe extending across the width of the dryer surface. The creping adhesive can be any of the types commonly used in tissue papermaking technology.

The paper web creped from the drying cylinder is passed through a nip formed by a pair of rolls and wound into a large roll referred to as a parent roll.

The tissue making process used in the examples can be generally characterized as a light weight, dry crepe process. A 14 inch wide pilot plant scale machine was operated as follows: Prior to web formation the paper furnish is contained in a machine chest where dry strength additives, dyes or other chemical additives are incorporated. The paper furnish is delivered via a fan pump which flows from a headbox through a slice at 0.1% to 0.4% consistency onto the horizontal surface of a Fourdrinier wire through which water is withdrawn and web formation takes place. The wire is entrained around a suction breast roll which aids in water removal and web formation. The wire is entrained around several guide rolls and a wire turning roll and is fed back to the breast roll. One of these rolls is driven to propel the Fourdrinier wire.

The wet web is formed on the upper surface of the Fourdrinier and transferred to a felt by means of a vacuum pick-up. The felt transports the sheet to a pressure roll assembly. The felt moves around one pressure roll, a solid rubber roll, and is entrained around guide rolls and rotates back to the vacuum pick-up. Moisture is removed in the nip of the pressure roll and transferred into the felt.

The formed web is pressed and transferred to the surface of a rotating drying cylinder, commonly referred to as a Yankee Dryer. The web is removed from the surface of the Yankee at a web dryness between 95% and 96% using a doctor blade. To assist in removing the web from the dryer surface in a controlled uniform state, a creping adhesive is applied to the Yankee surface using a spray nozzle. The adhesive mixture used in these examples was a 70/30 mixture of 70% polyvinyl alcohol and 30% of a starch based latex (National Starch Latex 4441).

The paper web creped from the drying cylinder was passed through a nip formed by a pair of rolls and wound into a parent roll of desired size for testing. The paper machine formed a web 14 inches wide and ran at a reel speed of 40 to 50 feet/minute. All of the dry creped tissue samples in the examples were produced at a basis weight of 10 pounds/ream and 18–20% crepe. The samples were converted to 2-ply tissue (20 pounds/ream) for all testing.

The synergistic result from the combination of oils, coarse fibers and surfactants is demonstrated in the following examples. All proportions used herein are by weight unless otherwise specified and fiber weight is based upon the air dried weight of the fiber unless otherwise indicated.

EXAMPLE 1

A fiber mixture was prepared of 100% virgin fibers of the type used to make newsprint in the United States. The pulp sample contained 60% low freeness (about 250°CSF) softwood chemithermomechanical pulp (SWCTMP), 30% softwood stoneground pulp and 10% northern softwood kraft pulp. This 60/30/10 blend of virgin fibers was selected to simulate the blends found in newsprint. Virgin fibers were employed because they do not contain any contaminants introduced in the manufacture of newspapers. The pulp was formed into a sheet of flat paper and dried without any chemical additions. The flat paper was divided into 6 representatives samples and, six separate papermaking furnishes were prepared from each flat paper sample and dry creped tissue product was produced from each flat paper furnish sample on a 14" wide dry crepe tissue machine as described above.

The six samples of flat paper were designated samples 1a through 1f. Sample 1a was left uncontaminated, while samples 1b through 1f were contaminated with oils and/or treated with enzymes and surfactants, before being repulped and made into light weight dry crepe tissue. Lightweight, dry crepe tissue products 1a through 1f were made from each of the samples 1a through 1f as follows:

Prior to making the 6% pulp slurry, flat paper samples 1c and 1d were each printed with soy bean oil using a gravure roll at an application rate of 1.5% oil based on the air-dried weight of the pulp. This fairly approximates the amount of oil contamination found on used newspapers. Flat paper samples 1e and 1f were printed in the same manner and with the same amount of oil but with mineral oil of a type typically found in printing inks used on newspapers rather than soy bean oil prior to making a pulp slurry. A separate pulp slurry was prepared with each tissue sample. A cationic starch dry strength resin Solvitose®—N (available from Nalco Chemical Co.) was added at a rate of 1% of the fiber weight. The pulp slurry at about 6% consistency was elevated to a temperature of 180° F. for 15 minutes. After being pulped and held at the elevated temperature for 15 minutes, the pulp slurry made with sample 1d (soy bean oil contaminated), the pulp slurry made with sample 1f (mineral oil contaminated), the pulp slurry made with sample 1b (no oil contamination) were cooled to about 140° F., and diluted to a consistency of 5%, and the pH was reduced from ambient pH obtained with just pulp and tap water to a pH of 5 by the slight addition of sulfuric acid. Twenty eight milliliters of High Point DI-600 (High Point Chemical Co.) surfactant per 100 pounds air dried pulp was added to the 5% consistency furnishes of samples 1b, 1d and 1f along with an enzyme mixture of cellulase enzyme (Celluclast 1.5 L, Novo Nordisk Bioindustrials, Inc.), xylanase (Pulpzyme HA, Novo Nordisk Bioindustrials, Inc.) and resinase (Resinase A 2X, Novo Nordisk Bioindustrials, Inc.). The enzyme addition uses 66.5 ml cellulase to 16.5 ml xylanase and 16.5 ml resinase per 100 lbs of air dried pulp. After addition of the enzymes and surfactant, the pulp slurries of samples 1b, 1d and 1f were held at about 140° F. for 30 minutes with mild agitation and then cooled and adjusted to pH 7 with sodium hydroxide. The pulp slurries for examples 1a, 1c and 1e were pulped and maintained at 180° F. for 15 minutes and then cooled. The six pulp slurries were then used to make lightweight dry crepe tissue as described above. The resulting tissue products 1a through 1f were in effect made by recycling. Significant differences in the softness in terms of handfeel for each sample were observed. A substantial, synergistic improvement in softness was obtained by the combination of oil contamination of the fibers and a treatment with both enzymes and surfactants. Table I gives the results of the Normalized Tensile Strength (basis weight and directionally normalized) and handfeel for the tissue samples 1a through 1f. It can be seen from the table that dramatic improvement in handfeel (perceived softness) is achieved by the combination of oil contamination on the tissue product and enzyme treatment. Visual observation of samples 1a through 1f showed a marked difference between the crepe pattern on the control sample 1a and samples 1d and 1f that had both oil contamination and enzyme surfactant treatment. The control had a typical dry creped appearance of discrete crepe lines and a cross section of the sheet showing an undulating or corrugated-like shape with distinct peaks and valleys. In contrast, the tissue produced with the oil contaminated and enzyme surfactant treated furnish had a more uniform thickness rather than a corrugated cross section and appeared to have more of an open structure and had significantly more crepe lines per inch.

EXAMPLE 2

Eight pulp furnishes were prepared, treated and made into lightweight dry crepe tissue product using the same papermaking procedures as in Example 1. Four tissue samples designated 2a, 2b, 2c and 2d were made with a pulp furnish containing 100% virgin pulp of which 60% was low freeness (250°CSF) softwood chemithermomechanical pulp (CTMP), 30% softwood stoneground wood pulp and 10% northern softwood bleached kraft as in Example 1. Four tissue samples designated 2e, 2f, 2g and 2h were made from a pulp obtained from repulping old newspaper (ONP). All tissue samples were first made by slurrying the pulp with water at 6% consistency. The slurry was raised to a temperature of 180° F. and maintained at the elevated temperature for 30 minutes. The pulp slurries for samples designated 2a and 2e were then each cooled and used directly as a furnish for making lightweight dry crepe tissue using the papermaking equipment and process described in example 1. Each of the pulp slurries for samples 2b, c, d, f, g and h were subjected to an additional treatment prior to papermaking. This treatment was comprised of reducing the temperature of the pulp slurry from 180° F. to 140° F., adjusting the pH with sulfuric acid to 5.0 and adjusting the consistency to 5%. Surfactant of the type typically used for deinking pulp was added at the rate of 28 ml. per 100 lbs of pulp to the slurries containing samples 2c, 2d, 2g and 2h. Enzyme addition was at a rate of 66.5 ml. for cellulase, 16.5 ml. xylanase and 16.5 ml. for lipase per 100 pounds of pulp, and the enzymes were added to the 140° F., 5% consistency slurries to be used for making tissue samples 2b, 2d, 2f and 2h. The 5% consistency slurries for all samples were then maintained at 140° F. for 30 minutes, cooled, adjusted to pH 7 with sodium hydroxide and used as furnish for making dry crepe tissue with the papermaking equipment and process described in Example 1. The cationic dry strength resin Solvitose® N was added to the furnish at a rate of 1% based on the weight of fibers. Tissue samples 2a through 2h were then tested for handfeel, tensile in both machine and cross machine direction and for basis weight. The results are shown in Table II. The results established that enzyme and surfactants treatment without oil does not produce the synergistic effect nor improve softness.

EXAMPLE 3

Eleven samples of dry crepe tissue designated 3a through 3k were made from various furnishes containing fibers of differing degrees of coarseness as measured by the Kajaani coarseness in mg/hundred meters using the Kajaani FS-200 instrument. Dry creped tissue product was produced using the papermachine and process described in Example 1 from furnishes having fibers with varying degrees of coarseness and fiber blends as shown in Table III.

Two samples of dry creped tissue were produced from each of the furnishes and designated 3a sample 1 and 3a sample 2 through 3k sample 1 and 3k sample 2 using the papermaking process described in Example 1. The difference between sample 1 and sample 2 for each furnish is that dry strength resin addition was varied to produce 2 tissue samples of each furnish having different strength levels. The dry strength additive was cationic starch dry strength resin (Solvitose® N—Nalco Chemical Co.). ONP was pulped and treated with enzyme and surfactant as described in Example 2. The pulp types and Kajaani coarseness in mg/hundred meters for each furnish are shown in Table III along with tissue test results. Since handfeel, values vary with variations in tensile strength, handfeel softness values were also determined at an NTS of 10.0 (metric) by linear interpolation or extrapolation of the handfeel softness values for sample 1 and sample 2 for each furnish. This allows the softness of tissue produced from each papermaking furnish to be compared at the same tensile strength. The handfeel data at 10.0 NTS and the coarseness values from Table. III are plotted in FIG. 1. Tissue samples 3a through 3j are designated as reference furnishes to illustrate the conventional relationship between fiber coarseness and tissue handfeel with a wide variety of furnishes. The ONP with the enzyme and surfactant treatment (3k) has a much higher handfeel at a given coarseness than the reference furnishes. These results demonstrate the unobvious improvement obtained with oils, enzyme, and surfactant treatments of the present invention in improving handfeel of coarse fibers.

TABLE I

| SAMPLE NO. | SAMPLE DESCRIPTION | HANDFEEL | NTS (METRIC) |
| --- | --- | --- | --- |
| 1a | Control | 53 | 7.4 |
| 1b | Control + enzyme/surfactant | 49 | 6.6 |
| 1c | Soybean oil | 65 | 8.9 |
| 1d | Soybean oil + enzyme/surfactant | 71 | 6.7 |
| 1e | Mineral oil | 56 | 12.3 |
| 1f | Mineral oil + enzyme/surfactant | 71 | 6.9 |

TABLE II

| SAMPLE # | SAMPLE DESCRIPTION | HANDFEEL | NTS (METRIC) |
| --- | --- | --- | --- |
| 2a | Control furnish - untreated | 38 | 15.8 |
| 2b | Control + enzyme | 40 | 16.8 |
| 2c | Control + surfactant | 37 | 18.3 |
| 2d | Control + enzyme/surfactant | 38 | 17.5 |
| 2e | ONP + untreated | 41 | 17.5 |
| 2f | ONP + enzyme | 48 | 13.1 |
| 2g | ONP + surfactant | 48 | 13.9 |
| 2h | ONP + enzyme/surfactant | 52 | 10.3 |

TABLE III

STRENGTH, HANDFEEL, AND COARSENESS DATA

| Sample Number | Furnish | Sample #1 NTS | Sample #1 Handfeel | Sample #2 NTS | Sample #2 Handfeel | Handfeel @ 10.0 NTS | Coarseness, mg/100 meters |
| --- | --- | --- | --- | --- | --- | --- | --- |
| 3a | 70% SSWK 30% HWCTMP | 9.7 | 33 | 10.4 | 31 | 32 | 23.2 |
| 3b | 50% NSWK/50% BEK | 9.6 | 86 | 10.9 | 81 | 86 | 10.8 |
| 3c | 25% NSWK/25% SSWK/ 50% BEK | 8.9 | 75 | 10.2 | 71 | 72 | 13.9 |
| 3d | 100% NSWK | 9.9 | 48 | 13.7 | 44 | 48 | 14.3 |
| 3e | 50% NSWK/50% RF | 10.5 | 44 | 16.0 | 39 | 44 | 13.8 |
| 3f | 100% RF | 12.2 | 40 | 14.8 | 37 | 43 | 12.2 |
| 3g | 33% NSWK/33% RF/ 33% SWCTMP | 11.8 | 33 | 14.7 | 31 | 34 | 16.7 |
| 3h | 50% NSWK/ 50% SWCTMP | 8.9 | 34 | 15.0 | 28 | 33 | 17.0 |
| 3i | 50% RF/50% SWCTMP | 10.0 | 26 | 15.0 | 24 | 26 | 16.8 |
| 3j | 100% SWCTMP | 9.4 | 26 | 12.8 | 20 | 25 | 25.0 |
| 3k | ONP + enzyme/surfactant | 8.6 | 68 | 10.3 | 52 | 54 | 25.9 |

We claim:

1. A sanitary paper product made from a papermaking furnish comprising cellulosic fibers at least 80% of which are coarse fibers treated with an enzyme selected from the group consisting of cellulase, hemicellulase, and lipase and combinations thereof and having a Kajaani coarseness greater than 18 milligrams per 100 meters, said tissue product having a basis weight of between 7 pounds per ream and 40 pounds per ream, a normalized tensile strength (metric) of between 5.00 and 20.0, and containing from about 0.2% to 2.0% of an oil selected from the group consisting of vegetable oils and mineral oils.

2. The improved product of claim 1 wherein the sanitary paper is a tissue paper having a basis weight between 7 and 35 pounds per ream, and a handfeel of at least 45 handfeel softness units.

3. The improved product of claim 1 further comprising said product containing a cationic dye.

4. The improved product of claim 1 wherein the sanitary paper is made at a basis weight between 20 and 40 pounds per ream and is a paper towel.

5. The sanitary paper product of claim 1, wherein the enzyme further includes an enzyme selected from the group consisting of ligninase, laccase, pectinase, protease, and mannanase and combinations thereof.

6. A sanitary paper product made from a papermaking furnish comprising cellulosic fibers at least 80% of which are coarse fibers treated with an enzyme selected from the group consisting of cellulase, hemicellulase, and lipase and combinations thereof and having a Kajaani coarseness greater than 18 milligrams per 100 meters, said tissue product having a basis weight of between 7 pounds per ream and 20 pounds per ream based on the strength properties of the cellulosic fibers without added binder material, a normalized tensile strength (metric) of between 5.00 and 20.0, and containing from about 0.2% to 2.0% of an oil selected from the group consisting of vegetable oils and mineral oils.

7. The sanitary paper product of claim 6, wherein the enzyme further includes an enzyme selected from the group consisting of ligninase, laccase, pectinase, protease, and mannanase and combinations thereof.

* * * * *